United States Patent Office 2,715,082
Patented Aug. 9, 1955

2,715,082

ELECTRIC STORAGE BATTERY

Carl Gritman, Sunland, Robert Broussard, Glendale, and Charles A. Toce, Sunland, Calif., and John H. Joynt, Alexandria, Va., assignors to Electro-Acid Corporation, a corporation of Texas No Drawing. Application May 4, 1953, Serial No. 352,986

3 Claims. (Cl. 136—154)

The present application for patent is a companion to our application Serial No. 301,422, filed July 29, 1952 and entitled Electric Storage Battery and the invention relates to lead-sulphuric acid storage batteries and to an improved electrolyte for the same.

One of the objects of our invention is the provision of an electric storage battery of the character indicated which is substantially free of sulphation and which has the capacity to permit the battery to be charged or discharged at high rates which would seriously impair or shorten the useful life thereof in the presence of the sulphuric acid electrolyte.

Another object is the provision of a battery which permits shipping and storage over long periods of time without attention; and which is rugged and strong and which is less sensitive to shock, vibration and wide temperature changes than the conventional lead-sulphuric acid battery.

Other objects in part will be obvious and in part pointed out hereinafter.

The invention accordingly consists in the combination of elements, features of construction and arrangements of parts, and in the composition of ingredients and in their relative proportions, the scope of the useful application of all of which is more fully described below and is more particularly defined in the claims at the end of this specification.

In order to better understand our invention it should be noted at this point that the common storage battery of the lead-sulphuric acid type employs plates of lead and lead-dioxide and an electrolyte of sulphuric acid of a density of about 1.275. Incidental to discharge, or perhaps to standing in discharged condition some sulphation takes place slowing up the current producing function and also slowing up the charging of the battery, this probably by obstruction of the movement of the electrolyte into and out of combination with the plates. The slowness of this action retards charging the battery at a rate in excess of about 60 amperes per cell for a 15 plate battery, also it retards any prolonged discharge of the battery in excess of that rate without danger of serious damage to the plates by loss of material or by buckling. Heretofore, attempts have been made to provide electrolytes which tend to prevent this so-called "sulphation" of the plates and permit increased charge and discharge rates without damage to the battery. So far as is known, however, none of these proposals have shown any proved continued public acceptance.

Accordingly, it is an object of our invention to provide an improved electric storage battery having lead-lead dioxide plates, together with an improved electrolyte; which battery has a capacity of more rapid charge and discharge without deleterious effects on the physical structure of the plates; which battery is strong, the plates being harder and less subject to loss of plate material in use than in the conventional battery; and which costs but little more than the conventional battery.

And, now referring more particularly to the practice of our invention, our battery employs a battery case of acid resistant material. Inside the case is provided at least one plate of lead dioxide forming the positive pole thereof and at least one plate of pure sponge lead forming the negative pole thereof. The electrolyte is formed according to the following formula:

Sulphuric acid $H_2SO_4$ _____ ⅓ by volume.
Distilled water $H_2O$ _____ ⅔ by volume.

To each 100 gallons of the above solution there is added selenium compound of the group selenium tetrabromide, selenium chloride and tetrachloride, selenium tetrafluoride, selenium iodide, tetraiodide and selenium oxybromide. The amount required is approximately one pound for each 100 gallons of electrolyte.

Upon adding the electrolyte to the battery with the said sponge lead and lead oxide plates, the battery is subjected to charging in the usual manner. This may be at a rate as high as 100 amperes per cell for the 15-plate battery. It is then put on discharge until fully discharged. Where desired, the charging may be conducted in two stages, an initial charging with dilute sulphuric acid to which selenium compound is added followed by a subsequent charging with fresh electrolyte of full strength to which the selenium compound is added.

While the exact chemical and electro-chemical reactions which take place incident to the charging and discharging of the battery are not conclusively known, the fact is that a 15-plate, 3-cell battery employing the new electrolyte above described can be subjected to a charging rate of as much as 100 amperes for several hours without excessive heating and without damage to the plates. Such a treatment would destroy the conventional battery having the common dilute sulphuric acid electrolyte. The discharge of the battery may be at equally high rates.

By way of test, a number of automobile batteries of different makes were purchased on the open market and were first fully charged at a rate that would not adversely effect the battery. These batteries together with a fully charged battery of the same size and embodying the present invention were subjected to breakdown tests which consisted in short circuiting the poles of each battery by means offering low resistance for successive periods of five seconds each. Of the purchased batteries, none survived more than 40 of such discharge intervals without being at least completely discharged. All of said purchased batteries heated excessively, in some cases, the battery case broke, in others the plates were badly warped, and in all cases the surface of the battery plates suffered inordinate losses of plate material. In contrast to the effects on these batteries the battery of the present invention experienced a slight rise in temperature and testing thereof was discontinued after 140 of such discharge intervals. On taking the battery apart for inspection after testing as above described, the plates were found to be in their original condition with no observable loss of material and no warping or other damage.

In the manufacture of the ordinary lead-acid storage battery, the plates are placed in the battery case with the dilute sulphuric acid electrolyte and the battery is charged at low rate. The electrolyte is then removed and fresh electrolyte of full strength is supplied. If the battery is not thereafter subjected to occasional charging to maintain it in substantially fully charged condition, it is subject to rapid deterioration. Thus the battery manufacturer must maintain the battery supplied with electrolyte and keep the battery charged until it is sold. The shipment of the acid-containing batteries is not only costly due to the added weight, but also, the shipment is hazardous due to the possibility of breakage or spillage with consequent damage to other shipments. Dry shipments and storage of the contact battery is practical because it readily sulphates.

In contrast with the conventional battery, in our battery the plates are placed in the electrolyte and charged at the previously specified high rate for, say three and one-half hours. Following this the battery is put on discharge and fully discharged. The plates thereafter are removed from the electrolyte and dried. Thereafter, the plates may be merely placed in a case, distilled water added, and the battery charged. The resultant product is a fully charged battery.

We find that for some reason as yet unknown, the hygroscopic characteristic commonly encountered in the lead-sulphuric acid battery is destroyed, although the dry plates possess the components which go into solution with water and produce the acid electrolyte at the proper strength when the battery is charged. While the plates are in dry condition they may be freely handled with the bare hand. Thus not only is it possible to ship the battery in dry condition with reduced cost and increased safety, but the plates may likewise be shipped with still further savings in transportation costs and equally increased safety. Still further, the battery once formed and charged, will remain charged indefinitely without substantial loss of effectiveness.

In our battery the proportion of selenic compound added to the electrolyte may be varied somewhat, say, between .05 per cent and .15 per cent or more by weight, although the proportion of about .1 appears to be the optimum proportion.

A further advantage of our invention is the discovery that the normal operating voltage per cell is increased from the usual 2 volts to about 2.2 volts. This may be the result of the fact that in the present invention the minute particles of active ingredients are increased in the selenium compound which deposits out and the attendant decrease in resistance to electron flow and the consequent increase in voltage noted. Whether this increased voltage is in fact due to a decreased resistance as above suggested or is due to an increased total electron release derived in some manner from the addition of the selenium compound which has not been determined, is not definitely known. But the facts are that the above-described combination of elements produces the recited results in output, in ability to safely withstand abnormal charging and discharge rates, in ability to maintain charged condition while not in service without need for constant charging input, and in the recited decrease in shipping costs and safety to other goods coming in contact therewith incident to shipment.

While the addition of the selenium component to the electrolyte is the most practicable mode of so doing, it may also be added in other manners such as a coating applied to the interior surface of the case or to the surfaces of the plates or that it can be incorporated in the plate material and more particularly in the lead dioxide plate. While it has not been definitely proved, it is suspected that the known property of certain selenium compounds for allowing current to pass therethrough in one direction and resisting current flow in the opposite direction may have some part in the novel, advantageous and valuable results achieved by the present invention. It does appear that the formation of some such selenium compound from the added selenium compounds may be a possibility under the influence of electron flow either through the charging of the battery or possibly as an incident to discharge thereof.

Although in the foregoing specification we have described certain practices of the invention, we do not thereby imply that the invention is to be deemed to be limited to the exact forms disclosed and it is to be understood that the invention embraces all such modifications as may come within the purview of the appended claims.

We claim:

1. In a storage battery, a fluid-containing case, a positive plate composed principally of lead dioxide and a negative plate composed principally of sponge lead disposed within said case, and an electrolyte in said case and comprising a solution of sulfuric acid and selenium compound of the group selenium tetrabromide, chloride, tetrachloride, tetrafluoride, iodide, tetraiodide and oxybromide in amount sufficient to prevent objectionable sulphation.

2. In a storage battery of the lead-lead peroxide sulphuric acid type, an electrolyte essentially consisting of dilute sulphuric acid and about 0.05% to 0.15% by weight of selenium compound of the group consisting of selenium tetrabromide, chloride, tetrachloride, tetrafluoride, iodide, tetraiodide, and oxybromide.

3. An electrolyte for storage batteries of the lead-lead peroxide sulphuric acid type, in the proportions of one hundred gallons dilute sulphuric acid, and about one pound of selenium compound of the group consisting of selenium tetrabromide, chloride, tetrachloride, tetrafluoride, iodide, tetraiodide and oxybromide.

References Cited in the file of this patent

UNITED STATES PATENTS

| 574,417 | Harris et al. | Jan. 5, 1897 |
| 2,649,766 | Johnson | Aug. 25, 1953 |

FOREIGN PATENTS

| 17,674 | Great Britain | of 1905 |
| 15,369 | Great Britain | of 1888 |

OTHER REFERENCES

Principles of Applied Electrochemistry, by Allmand, pages 226 and 227, 1912.

Storage Batteries, by Vinal, pages 24–25, 118, 119, 140, 141, 307–311, 1940.